United States Patent
Norikawa et al.

[11] Patent Number: 5,806,899
[45] Date of Patent: Sep. 15, 1998

[54] FLEXIBLE CONNECTION TUBE FOR AUTOMOTIVE EXHAUST SYSTEM

[75] Inventors: Tanomo Norikawa; Hiroyuki Aihara, both of Yokosuka, Japan

[73] Assignee: Calsonic Corporation, Tokyo, Japan

[21] Appl. No.: 731,736

[22] Filed: Oct. 18, 1996

[30] Foreign Application Priority Data

Oct. 23, 1995 [JP] Japan ................................. 7-274319
Oct. 23, 1995 [JP] Japan ................................. 7-274320
Oct. 23, 1995 [JP] Japan ................................. 7-274321

[51] Int. Cl.$^6$ ............................ F16L 51/02; F16L 27/12
[52] U.S. Cl. ..................... 285/299; 285/226; 285/300; 92/47
[58] Field of Search ................. 285/226, 299, 285/300, 301, 47, 49; 92/34, 47

[56] References Cited

U.S. PATENT DOCUMENTS

| | | | |
|---|---|---|---|
| 3,549,176 | 12/1970 | Contreras | 285/226 |
| 4,445,332 | 5/1984 | Thies et al. | 285/226 |
| 5,145,215 | 9/1992 | Udell | 285/300 |
| 5,437,479 | 8/1995 | Hartling et al. | 285/300 |
| 5,660,419 | 8/1997 | Kim | 285/301 |

FOREIGN PATENT DOCUMENTS

| | | |
|---|---|---|
| 42 02 808 | 8/1993 | Germany . |
| 295 03 927 | 10/1995 | Germany . |
| 63-47613 | 12/1988 | Japan . |
| 1-160114 | 11/1989 | Japan . |
| 3-55778 | 12/1991 | Japan . |
| 2620508 | 9/1949 | Switzerland ................ 285/226 |
| 675263 | 7/1979 | U.S.S.R. ..................... 285/226 |
| 1767274 | 10/1992 | U.S.S.R. ..................... 285/226 |

*Primary Examiner*—Eric K. Nicholson
*Attorney, Agent, or Firm*—Foley & Lardner

[57] ABSTRACT

A flexible connection tube for an automotive exhaust system comprises a flexible metal bellows adapted to be connected between a run of exhaust piping for absorbing expansion or contraction of the exhaust piping, and an outer knitted metal-wire braid covering the outer periphery of the bellows for protecting the bellows from damage and for preventing the bellows from stretching to its full length. The outer knitted metal-wire braid is formed into a substantially cylindrical shape by knitting plural metal-wire bundles (each bundle being produced by a plurality of parallelly bonded metal wires) alternately with each other in spiral directions with respect to the axial direction of the bellows. Apertures are defined by many groups of four adjacent metal-wire bundles knitted alternately with each other. A total opening area of all of the apertures is set within a range of 20% to 50% with respect to an over-all area of a curved surface of the outer knitted metal wire braid, for providing a substantially cylindrical low-density knitted outer metal wire braid.

10 Claims, 7 Drawing Sheets

SPRING-CONSTANT CHARACTERISTICS
(FLEXIBLE TUBE ASSEMBLY)

FIG.9

BELLOWS SURFACE-TEMP. MEASUREMENT

FLEXIBLE CONNECTION TUBE FOR AUTOMOTIVE EXHAUST SYSTEM

BACKGROUND OF THE INVENTION

1. Field of the Invention

The present invention relates to a flexible connection tube suitable for use in automotive exhaust systems, and specifically to a flexible connection tube that provides a flexible connection between front and rear exhaust pipes for absorbing engine vibrations and unpleasant vibrations input from road wheels to a run of exhaust piping.

2. Description of the Prior Art

Figure 12:
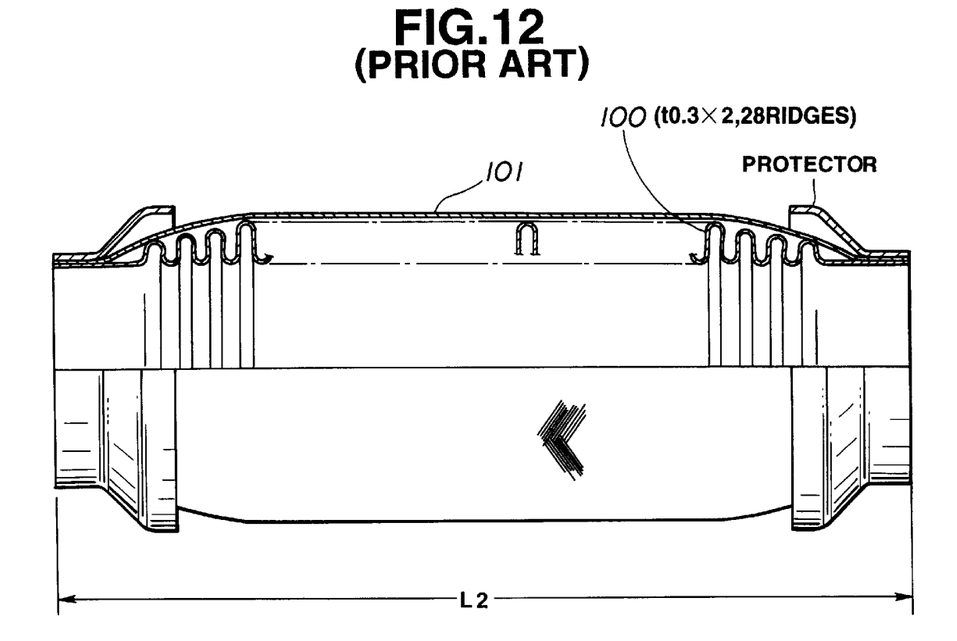
FIG. 12 is a prior art flexible connection tube assembly disposed between front and rear exhaust pipes, half sectioned.
Figure 13:
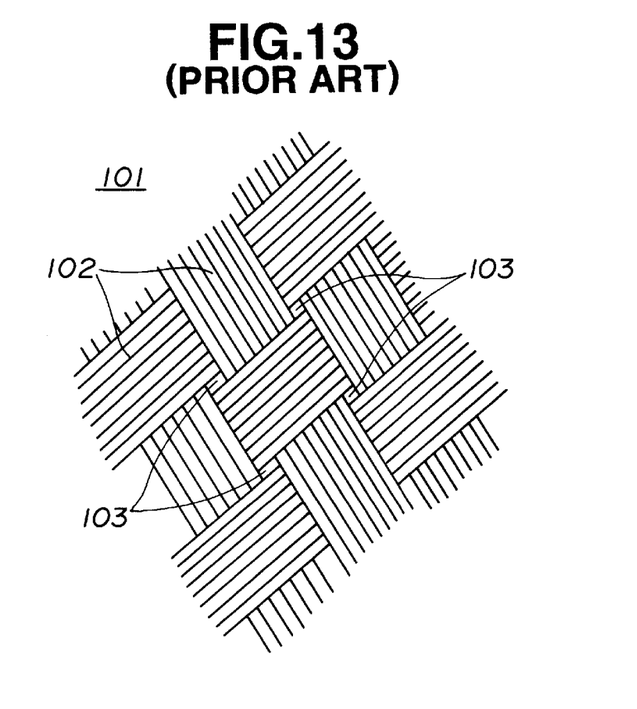
FIG. 13 is a partially enlarged view illustrating a high-density knitted metal wire outer braid employed in the prior art flexible tube assembly.

As is generally known, an automotive exhaust system often employs a flexible connection tube assembly disposed between front and rear exhaust pipes to effectively absorb undesired vibrations input to a run of exhaust piping or to absorb thermal expansion or contraction of the exhaust piping, thus increasing a life of the exhaust piping. Such a flexible connection tube is generally formed with an outer flexible tube often called "outer braid", an inner flexible tube often called inner braid, and a flexible metal bellows disposed between the outer and inner flexible tubes, so as to compensate linear expansion or contraction of the run of exhaust piping through their compressing or stretching motion. Such flexible connection tubes have been disclosed in Japanese Utility Model Second Publication Nos. 3-55778 and 63-47613, and Japanese Utility Model Provisional Publication No. 1-160114. Referring now to FIGS. 12 and 13, there is shown a construction of a typical flexible connection tube assembly for automotive exhaust systems. As seen in FIG. 12, the prior art flexible connection tube is typically composed of at least a flexible metal bellows 100 and an outer flexible tube 101 covering the outer periphery of the metal bellows 100 for the purpose of protecting the bellows from damage such as flying gravel or stone sprung from tires and of preventing the bellows from stretching to its full length. As clearly seen in FIG. 13, the outer flexible tube 101 comprises a knitted metal wire mesh tube or a knitted metal wire braid. The knitted metal wire braid is formed of many bundles 102 of fine metal wires (usually fine stainless steel wires), each being produced by bonding or connecting a plurality of similar fine metal wires parallel to each other just like a strip of ribbon. The bundles 102 are knitted alternately to each other in their spiral directions with respect to the axial direction of the flexible tube assembly so that one of two adjacent bundles (extending parallel to each other in their first spiral directions) is knitted alternately with the other bundle with the aid of two adjacent bundles (extending parallel to each other in their second spiral directions crossing to the first spiral directions). Ordinarily, each opening end of the knitted metal wire braid (the outer flexible tube 101) is mounted on the outer periphery of the associated opening end of the flexible metal bellows 100 and thereafter a substantially cylindrical metal protector is fitted onto the outer periphery of the opening end of the knitted metal wire braid. After assembling, the three members, namely the metal protector, the outer flexible tube 101, and the flexible metal bellows 100 are integrally connected to each other usually by way of spot welding. The outer flexible tube 101, composed of a knitted metal wire braid, functions to protect the metal bellows 100 from damage for example flying gravel and to prevent the bellows from stretching to its full length by the aid of a proper flexibility and extensional rigidity of the outer flexible tube 101. As seen in FIG. 13, two opposing inside edges of two adjacent metal-wire bundles 102 (extending parallel to each other in their first spiral directions or in their first oblique directions) and two opposing inside edges of two adjacent metal-wire bundles 102 (extending parallel to each other in their second spiral directions or in their second oblique directions) cooperate with each other to define a slight square aperture 103. Since the conventional outer flexible tube (or the outer braid) 101 is formed as a high-density knitted metal wire braid by densely tightly knitting a plurality of metal-wire bundles 102, the slight apertures 103 are almost negligible when the engine is in inoperative. In case of such a conventional flexible tube assembly with a comparatively high-density knitted metal wire braid 101, there is a greatly-decreased tendency for powdered, sticky or wet salt (used for snow-melting) to enter through the respective slight apertures 103 into an intermediate space defined between the metal bellows 100 and the outer flexible tube 101. The powdered salt, or sticky or wet salt will be hereinafter referred to as "snow-melting salt". In other words, once snow-melting salt enters through the slight apertures 103 into the intermediate space between the bellows 100 and the outer knitted flexible tube 101, it may be difficult to exhaust the snow-melting salt from the intermediate space to the outside of the outer flexible tube 101, and thus the snow-melting salt may be accumulated in the previously-noted intermediate space. The accumulated snow-melting salt causes an increase in a salt density in the intermediate space between the bellows and the outer flexible tube, and as a result the intermediate space may be gradually changed to a high-temperature salt-damage corrosion environment. Even when the outer flexible tube 101 is formed by tightly knitting a plurality of metal-wire bundles 102 with an extremely high density and a somewhat small square aperture 103 is defined among four adjacent metal-wire bundles 102 in a stopped state of the vehicle, the outer flexible tube 101 may expand and contract owing to various vibrations imposed to the exhaust system or thermal expansion when the engine is running. The expansion and contraction of the outer flexible tube 101 results in expansion and contraction of the respective aperture 103. For the reasons set out above, irrespective of whether the outer flexible tube 101 is formed by tightly or loosely knitting a plurality of metal-wire bundles 102 with a high density or a low density, it is difficult to perfectly prevent snow-melting salt from entering into the intermediate space between the bellows and the outer flexible tube. Melted snow containing salt, called snow-melt water (of a high salt density), tends to enter the inside of the outer flexible tube 101 by a well-known capillary phenomenon or a capillary action. Owing to the snow-melt water containing salt, a film of crystallized salt is deposited over the outer peripheral wall of the metal bellows 100 and over the inner peripheral wall of the outer flexible tube 101 via evaporation of water. The deposited salt tends to fall away from the metal bellows 100 and the outer flexible tube 101 due to vibrations transmitted to the exhaust system, thus producing many lumps of dry salt in the previously-noted intermediate space. On the other hand, the flexible metal bellows 100 is generally made of stainless steel, and thus the flexible stainless steel bellows 100 has a high heat resistance against high-temperature environment and a high corrosion resistance against corrosion environment such as salt-damage. However, the stainless steel bellows 100 tends to be corroded under a particular condition where the bellows is always subjected to exhaust heat (excessively high temperature) under a salt-damage environment of a high salt density. The particular condition will be hereinafter referred to as a "high-temperature salt-damage corrosion environment" or a "high-temperature intergranular corrosion environment". That is, where the stainless steel bellows 100 is subjected to exhaust heat for a long time during operation of the engine, a chromium component contained in stainless steel bellows combines with carbon, gradually reducing the chromium content of the stainless steel bellows. Some concavities or apertures could be formed on the bellows owing to the decrease in the chromium content, and then granular salt (sodium chloride) would enter the concavities or apertures on the bellows under such a salt-damage environment, with the result that corrosion would be accelerated. In other words, in accordance with the decrease in the chromium content of the stainless steel bellows, the composition of the stainless steel bellows 100 is gradually changed toward ferrous-metal chemical composition and thus the stainless-steel bellows 100 becomes apt to corrode under the previously-discussed high-temperature salt-damage corrosion environment. Therefore, in case of the conventional flexible tube assembly with a high-density knitted stainless-steel-wire outer braid 101, the stainless steel bellows 100 must be designed to have a thickness enough to resist against the previously-noted high-temperature salt-damage corrosion and additionally to provide a proper spring constant enough to absorb and compensate for linear expansion or contraction of a run of exhaust piping. The spring constant is dependent on the number of ridges of the stainless steel bellows 100. As may be appreciated, the larger the number of ridges of a metal bellows, the smaller the spring constant of the bellows. The prior art flexible stainless steel bellows 100 shown in FIG. 12 is made of a two-layer stainless steel plate or a bimetallic plate composed of two similar stainless steel plates (each having a thickness of 0.3 mm), bonded together, and formed into a bellows of 28 ridges by means of bending. As a consequence, the prior art flexible stainless steel bellows 100 of its thickness of 0.6 mm (t0.3 mm×2) and 28 ridges, can provide a spring constant having an axial displacement (or an elongation) of 10 mm under a tensile load of 14 kgf or less. Such a spring constant of the bellows 100 ensures a sufficient performance (flexibility) required for a flexible stainless steel bellows or a bellows expansion joint, thus satisfactorily absorbing or compensating for linear expansion or contraction of the exhaust piping system. The entire length L2 of the prior art stainless steel bellows 100 of its thickness of 0.6 mm and 28 ridges is approximately 270 mm and as a result the flexible tube assembly itself is large-sized.

Although it is not shown in FIG. 12, a conventional flexible connection tube assembly often includes an inner flexible tube, called inner braid, formed of a braided stainless-steel-wire tube similar to the previously-described outer flexible tube 101. The so-called inner braid is provided at the inside of the flexible metal bellows to form an intermediate exhaust-gas flow passage between front and rear exhaust pipes, and to reduce a noise level of exhaust-gas flow, particularly a turbulence noise secondarily caused by turbulent flow occurring at inwardly projecting furrows of the bellows, and additionally to protect the bellows from heat damage (high-temperature exhaust gases). Generally, the knitted or braided structure of the inner flexible braid may provide a high noise-reduction effect. However, there is less heat insulating effect of the inner braid because of a plurality of square apertures defined among four adjacent stainless steel wire bundles constructing the inner braid. In consideration of a sufficient heat resistance against heat damage to the inner peripheral wall of the bellows, as well as a sufficient corrosion resistance against the previously-discussed high-temperature salt-damage corrosion on the outer peripheral wall surface of the bellows, the minimum permissible thickness of the stainless steel bellows, usually formed of a two-layer stainless steel plate, is dimensioned to be a relatively great value, such as 0.6 mm.

SUMMARY OF THE INVENTION

Accordingly, it is an object of the invention to provide an improved flexible connection tube suitable for automotive exhaust systems that avoids the foregoing disadvantages of the prior art.

It is another object of the invention to provide a flexible connection tube assembly connected between front and rear exhaust pipes and employing at least a flexible metal bellows and an outer braided flexible metal wire tube disposed at the outside of the bellows, which assembly is largely small-sized and lightened, while satisfying a required performance (a proper flexibility) of the bellows and insuring a resistance against a so-called high-temperature salt-damage corrosion.

It is a further object of the invention to provide a flexible connection tube assembly connected between front and rear exhaust pipes and employing at least a flexible metal bellows and an outer braided flexible metal wire tube disposed at the outside of the bellows, which assembly has an entire length of not more than half an entire length of a typical prior-art flexible connection tube assembly.

It is a still further object of the invention to provide a small-sized and light-weight flexible connection tube assembly connected between front and rear exhaust pipes and employing at least a flexible metal bellows, an outer braided flexible metal wire tube disposed at the outside of the bellows and an inner braided flexible metal wire tube disposed at the inside of the bellows, which assembly ensures a proper flexibility and a satisfactory high-temperature salt-damage corrosion resistance and reduces production costs.

In order to accomplish the aforementioned and other objects of the invention, a flexible connection tube for an automotive exhaust system comprises a flexible bellows adapted to be connected between a series of exhaust pipes for absorbing expansion or contraction of the exhaust pipes, and an outer knitted metal wire braid covering an outer periphery of the bellows for protecting the bellows from damage and for preventing the bellows from stretching to its full length. The outer knitted metal wire braid comprises a plurality of metal-wire bundles, each having a plurality of metal wires connected parallel to each other and in contact with each other with respect to a lateral direction of the metal wires. The outer knitted metal wire braid has a substantially cylindrical shape formed by knitting the plurality of metal-wire bundles alternately with each other in spiral directions with respect to an axial direction of the bellows so that each of the metal-wire bundles extends along the outer periphery of the bellows in its spiral direction over both ends of the bellows. A plurality of apertures defined by groups of four adjacent metal-wire bundles knitted alternately with each other is formed in the wire braid. The total opening area of all of the apertures is set within a range of 20% to 50% with respect to an over-all area of a curved surface of the outer knitted metal wire braid, to provide a substantially cylindrical low-density knitted outer metal wire braid. It is preferable that the bellows is a flexible metal bellows having 15 or less ridges and a thickness equivalent to a spring constant having an elongation of 10 mm under a tensile load of 14 kgf or less. The bellows may be made of a two-layer stainless steel plate composed of two similar stainless steel plates bonded together, each having a thickness of 0.2 mm, and formed into a bellows of 9 ridges by bending. The flexible connection tube may further comprise an inner heat-damage protective pipe disposed in the bellows for protecting the bellows from heat damage. The bellows are formed with a pair of substantially cylindrical female tube-like portions at its both ends. The heat-damage protective pipe may comprise two opposing, axially extending diametrically diminished exhaust-pipe ends, respectively inserted into the female tube-like portions. For the purpose of setting the total opening area of the apertures within the range of 20% to 50% with respect to the over-all area of the curved surface of the outer knitted metal wire braid, it is preferable to reduce at least one of a wire diameter of each of the metal wires, the number of the metal-wire bundles constructing the substantially cylindrical low-density knitted outer metal wire braid, and the number of the metal wires constructing each of the metal-wire bundles, in comparison with a conventional high-density knitted metal-wire outer braid.

According to another aspect of the invention, a flexible stainless steel connection tube for an automotive exhaust system comprises a flexible austenitic-stainless-steel bellows adapted to be connected between a run of exhaust piping for absorbing expansion or contraction of the exhaust piping and an outer knitted stainless-steel-wire braid covering an outer periphery of the bellows for protecting the bellows from damage and for preventing the bellows from stretching to its full length. The outer knitted stainless-steel-wire braid is formed of a plurality of stainless-steel-wire bundles, each comprising a plurality of similar stainless steel wires connected parallel to each other and in contact with each other with respect to a lateral direction of the stainless steel wires. The outer knitted stainless-steel-wire braid has a substantially cylindrical shape formed by knitting the plurality of stainless-steel-wire bundles alternately with each other in spiral directions with respect to an axial direction of the bellows so that each of the stainless-steel-wire bundles extends along the outer periphery of the bellows in its spiral direction over both ends of the bellows. A plurality of apertures is defined by groups of four adjacent stainless-steel-wire bundles knitted alternately with each other, is formed in the wire braid. A total opening area of all of the apertures is set within a range of 20% to 50% with respect to an over-all area of a curved surface of the outer knitted stainless-steel-wire braid, to provide a substantially cylindrical low-density knitted outer stainless-steel-wire braid.

DESCRIPTION OF THE PREFERRED EMBODIMENTS

Figure 1:
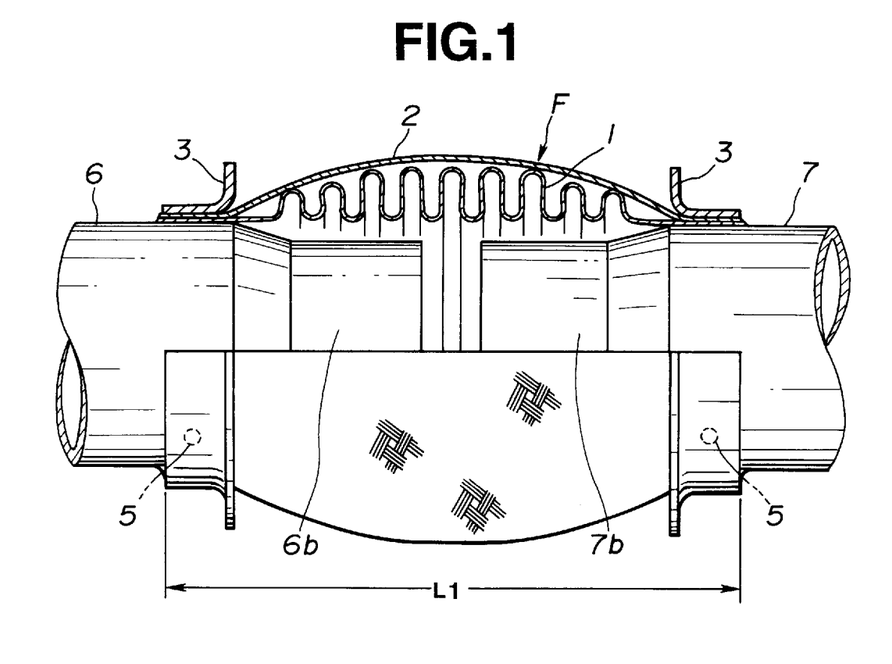
FIG. 1 is an illustration of one embodiment of a flexible connection tube assembly of the present invention, disposed between front and rear exhaust pipes, half sectioned.
Figure 2:
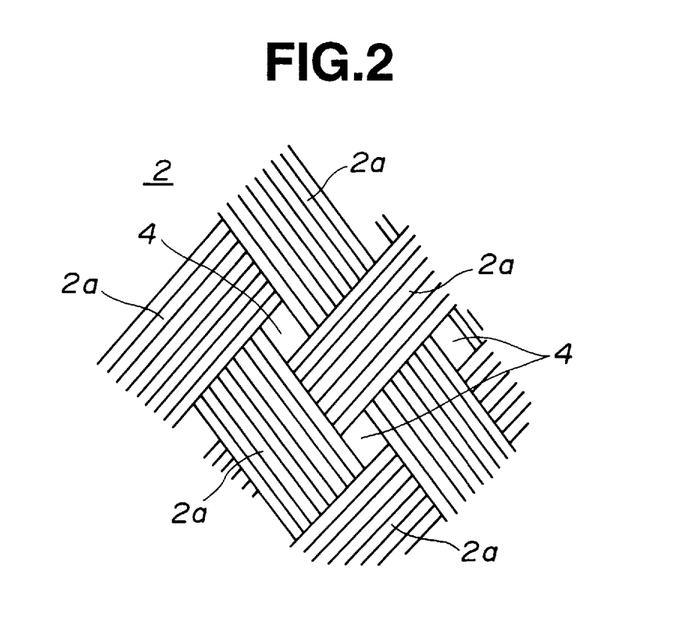
FIG. 2 is a partially enlarged view illustrating a low-density knitted metal wire outer braid employed in the flexible connection tube assembly of the embodiment.
Figure 3:
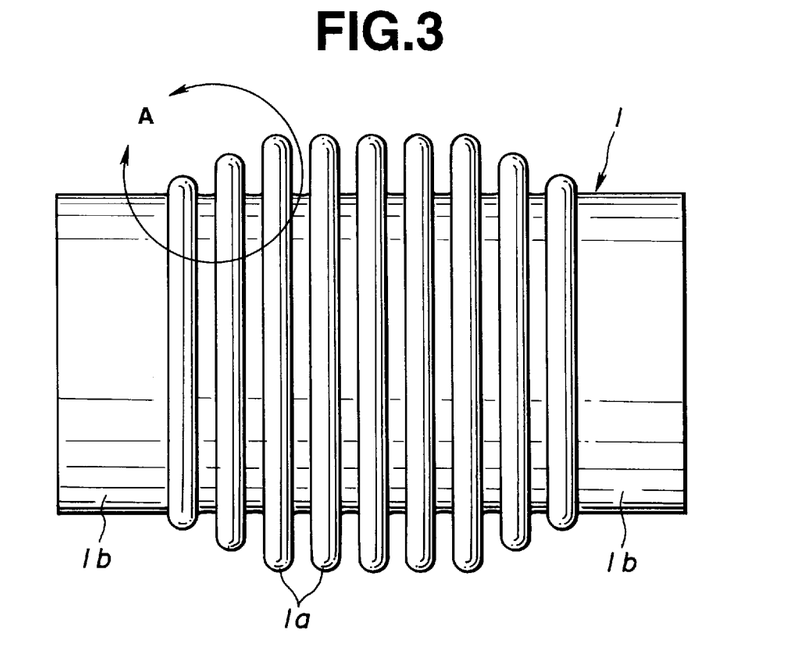
FIG. 3 is a side view illustrating a flexible metal bellows employed in the flexible connection tube assembly of the embodiment.
Figure 4:
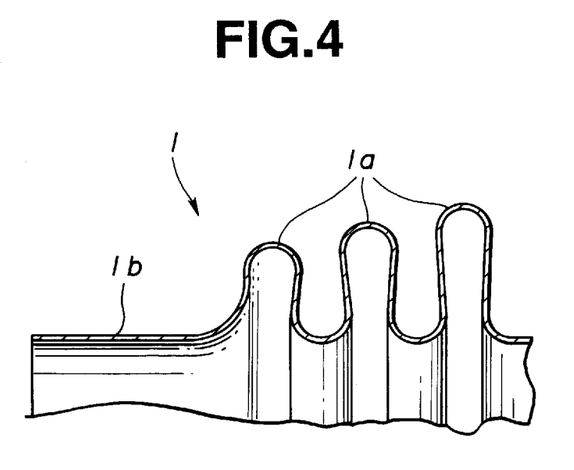
FIG. 4 is a partially enlarged sectional view illustrating a portion of the metal bellows indicated by a circled arrow A of FIG. 3.
Figure 5A:
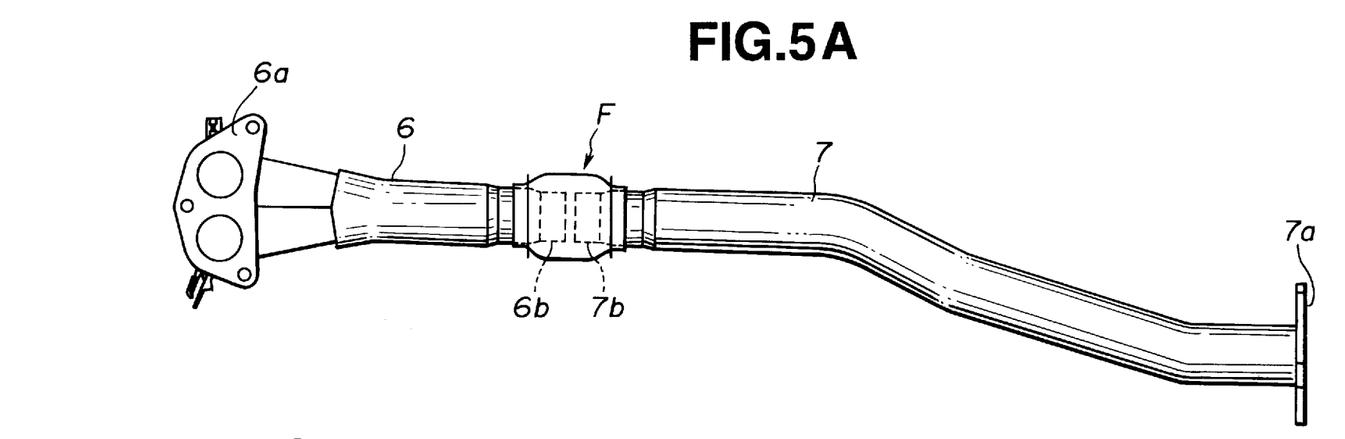
FIG. 5A is a plan view illustrating a run of exhaust piping with the flexible tube assembly of the embodiment, installed between front and rear exhaust pipes.
Figure 5B:
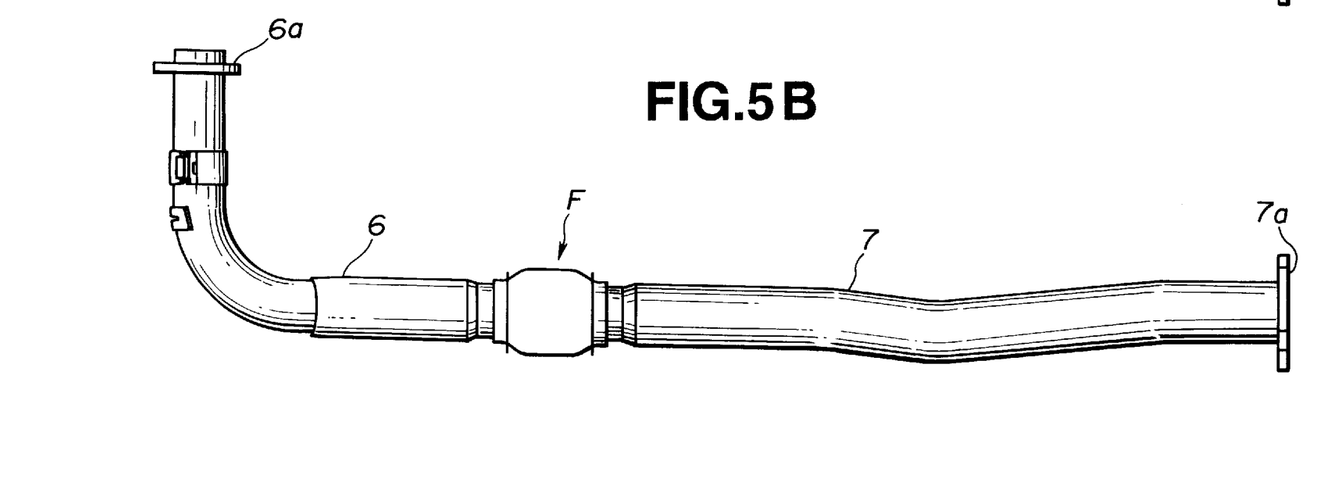
FIG. 5B is a side view illustrating the run of exhaust piping with the flexible tube assembly of the embodiment.

Referring now to the drawings, particularly to FIGS. 1, 2, 3, 4, 5A and 5B, a flexible connection tube assembly F made according to the invention is provided between front and rear exhaust pipes 6 and 7 (see FIGS. 5A and 5B). The flexible tube assembly F includes a flexible metal bellows 1, an outer flexible tube 2 covering the outer periphery of the metal bellows 1, comprising a knitted metal wire braid, and a pair of metal protectors 3. As seen in FIG. 1, the protectors 3 are fitted onto respective outer peripheries of two essentially cylindrical opening ends of the outer flexible tube 2 in such a manner as to sandwich each end of the outer flexible tube 2 between the associated protector 3 and the associated opening end of the bellows 1, so as to protect both ends of the bellows 1 and to fixedly connect the outer flexible tube 2 to the bellows 1. As may be appreciated from a plurality of spot welded portions denoted by 5 in FIG. 1, the bellows 1, the outer flexible tube 2, and the protectors 3 are integrally connected to each other by way of spot welding. The metal bellows 1 has a pair of female tube-like portions 1b (see FIGS. 3 and 4) at its both end opening ends. A rear end of the front exhaust pipe 6 and a front end of the rear exhaust pipe 7 are inserted into the female tube-like portions 1b for connection of the bellows 1 between the front and rear exhaust pipes 6 and 7. Usually, the flexible connection tube assembly F is fixedly connected between the front and rear exhaust pipes 6 and 7 by means of welded connection between the outermost ends of the female tube-like portions of the bellows 1 and the outer peripheries of the front and rear exhaust pipes 6 and 7. The metal bellows 1, provided between the front and rear exhaust pipes, serves to effectively absorb or compensate for linear expansion or contraction of a run of exhaust piping when the run of exhaust piping expands or contracts owing to engine vibrations and another vibrations transmitted through road wheels to the exhaust piping. The outer flexible tube 2 comprises a knitted stainless steel wire braid. The knitted stainless steel wire braid 2 is formed of a plurality of stainless-steel-wire bundles, each bundle 2a being produced by bonding or connecting a plurality of similar fine stainless steel wires parallel to each other and in contact with each other with respect to their lateral direction, just like a belt or a strip of ribbon. The plurality of stainless-steel-wire bundles 2a are knitted alternately with each other in their spiral directions with respect to the axial direction of the flexible connection tube assembly F (equivalent to an axial direction of the bellows) so that each of the bundles 2a extends along the outer periphery of the bellows 1 in its spiral direction over both ends of the bellows and so that one of two adjacent bundles (extending parallel to each other in their first spiral directions) is knitted alternately with the other bundle with the aid of two adjacent bundles (extending parallel to each other in their second spiral directions crossing to the first spiral directions). The outer flexible tube 2 will be hereinafter abbreviated simply to "outer braid". As is generally known, the outer braid 2 is provided for protecting the bellows 1 from damage such as flying gravel or stone sprung from tires and for preventing the bellows from stretching to its full length. As seen in FIG. 2, two opposing inside edges of two adjacent stainless-steel-wire bundles 2a extending parallel to each other in their first spiral directions or in their first oblique directions and two opposing inside edges of two adjacent stainless-steel-wire bundles 2a extending parallel to each other in their second spiral directions or in their second oblique directions cooperate with each other to define a square or rhombic aperture 4. Thus, a plurality of apertures 4 are defined by many groups of four adjacent stainless-steel-wire bundles 2a. In the shown embodiment, the metal bellows 1 is made of a two-layer austenitic stainless steel plate or a bimetallic austenitic stainless steel plate composed of two similar austenitic stainless steel plates (each having a thickness of 0.2 mm), bonded together, and bent into a flexible stainless steel bellows of nine ridges 1a. As clearly seen in FIGS. 1, 3 and 4, the outside diameters of five intermediate ridges of the bellows 1 are identical to each other and the outside diameters of both endmost ridges of the bellows are identical to each other and designed to be less than the intermediate ridges of the same outside diameter. The bellows 1 has two second smallest ridges between the smallest endmost ridges and the intermediate ridges, so that the outside diameters of ridges of the bellows 1 are gradually enlarged from the endmost ridge via the second smallest ridge to the intermediate ridge. As seen in FIG. 4, the bellows 1 has two cylindrical female tube-like portions 1b that support an inner heat-damage protective pipe as will be more fully described later. As appreciated from FIG. 1, since the outer braid 2 is contoured adjacent to the outer periphery of the bellows 1, the outer braid 2 is formed into a substantially barrel-shaped tube owing to three adjacent ridges each having a different outside diameter. Note that the outer braid 2 employed in the flexible tube assembly F of the embodiment is formed as a comparatively low-density knitted stainless-steel-wire braid by roughly loosely knitting or braiding a plurality of stainless-steel-wire bundles 2a so that the total opening area of all of the square or rhombic apertures 4 is within a range of 20% to 30% with respect to the over-all area of the curved surface of the barrel-shaped outer braid 2. The over-all curved-surface area includes the total opening area of all of the apertures 4. To produce one low-density outer braid 2 of a flexible tube assembly F of the embodiment, 48 stainless-steel-wire bundles 2a, each bundle being produced by parallelly connecting a plurality of stainless steel wires of 0.4 mm in wire diameter, are required, in the same manner as the prior art high-density knitted stainless steel wire braid. That is, in the preferred embodiment, the number of stainless-steel-wire bundles of the improved low-density knitted outer braid is similar to the number of stainless-steel-wire bundles of the prior art high-density knitted outer braid. In case of the flexible tube assembly made in accordance with this invention ten fine stainless steel wires are used to form one stainless-steel-wire bundle 2a and consequently to produce a low-density braided stainless-steel-wire outer flexible tube 2, hitherto fourteen fine stainless steel wires was used to form a high-density braided stainless-steel-wire outer flexible tube. Owing to reduction or cut-back in four stainless steel wires per one bundle, four adjacent stainless-steel-wire bundles 2a of the outer braid 2 of the embodiment can provide a square aperture 4 of 1.6 mm (=0.4 mm×4) or more in side. In other words, the reduction in the number of required stain steel wires per stainless-steel-wire bundle causes such a comparatively larger square aperture 4 that is substantially equivalent to an area of a hole of an inside diameter of 2 to 4 mm. As shown in FIGS. 5A and 5B, the front exhaust pipe 6 has a front flanged portion 6a connected to an exhaust manifold, whereas the rear exhaust pipe 7 has a rear flanged portion 7a usually connected to a main muffler unit. In addition, the front exhaust pipe 6 has a rear tube-like extension 6b, while the rear exhaust pipe 7 has a front tube-like extension 7b. As discussed later, the tube-like extensions 6b and 7b are cooperative with each other to form a heat-damage protective pipe.

Figure 6:
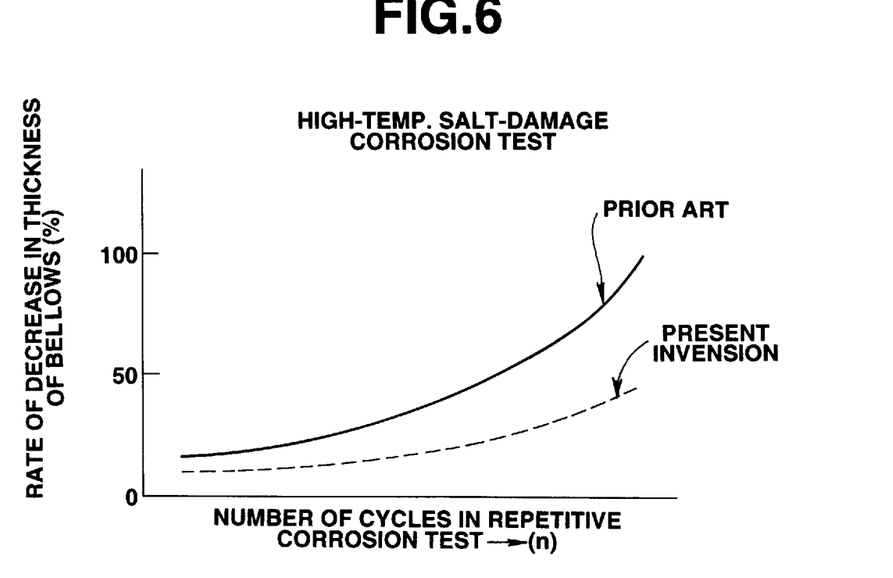
FIG. 6 is a graph illustrating test results of a so-called high-temperature salt-damage corrosion test which is made to both an improved flexible connection tube assembly with a low-density knitted metal wire outer braid and a flexible metal bellows and a prior art flexible connection tube assembly with a high-density knitted metal wire outer braid and a flexible metal bellows.

On actual braiding work for the outer braid 2, in case of the outer braid of the preferred embodiment, the number of braiding (48 stainless-steel-wire bundles 2a) and the distance between two adjacent bundles parallel to each other are similar to the prior art high-density outer braided stainless-steel-wire flexible tube. Also, used is a stainless steel wire of a wire diameter (0.4 mm) similar to the prior art high-density knitted outer braid. As previously explained, only the number of stainless steel wires used for one bundle of the outer braid 2 is reduced by some wires such as four wires as compared with the prior art outer braid. As a result of this, the width of each stainless-steel-wire bundle 2a is narrowed in comparison with the prior art outer braid. As set out above, substantially in accordance with the same manner as a manufacturing method for producing a prior art outer braid, a low-density braided outer flexible tube 2 employed in the flexible tube assembly of the invention can be easily produced by reducing only the number of stainless steel wires used for one stainless-steel-wire bundle 2a, while defining a comparatively large square aperture 4 among four adjacent bundles braided each other in four different directions. The improved outer braid 2 having a plurality of comparatively large square apertures 4 operates as follows. During driving of the vehicle on snow roads with snow-melting salt, the comparatively large, plural apertures 4 may permit easy entry of snow-melting salt or snow-melt water into the interior of the outer braid 2 therethrough. The snow-melting salt or snow-melt water, easily entering into the intermediate space defined between the bellows 1 and the outer braid 2, may be adhered to and deposited over the outer peripheral wall of the bellows 1 and over the inner peripheral wall of the outer braid 2 in the form of crystallized salt by the aid of exhaust heat. Owing to vibrations transmitted to the exhaust system, although many lumps of deposited dry salt may fall away from both the bellows 1 and the outer braid 2 in the intermediate space defined therebetween, the scattered lumps of dry salt can be easily exhausted from the plural apertures 4 to the exterior of the outer braid 2, with the result that there are less remaining lumps of dry salt in the intermediate space and the salt density of the intermediate space is maintained at a low level. There is a less possibility that the bellows 1 is subjected to a so-called salt-damage corrosion environment of a high salt density, and thus high-temperature salt-damage corrosion can be reduced remarkably. Referring now to FIG. 6, there is shown a high-temperature heat-damage corrosion test. Test results shown in FIGS. 6 through 9 were assured by the inventors of the present invention. The corrosion test is made to two test samples, one being a prior art flexible connection tube that a conventional high-density knitted stainless-steel-wire outer braid is combined with a two-layer austenitic stainless steel bellows made of two similar stainless steel plates (each having a thickness of 0.3 mm) bonded together, and the other being an improved flexible connection tube that a low-density knitted stainless-steel-wire outer braid made according to the invention is combined with a two-layer austenitic stainless steel bellows made of two similar stainless steel plates (each having a thickness of 0.3 mm) bonded together. For the purpose of comparison of the improved low-density knitted stainless-steel-wire outer braid (having a plurality of relatively larger square apertures 4) with the prior art high-density knitted stainless-steel-wire outer braid (having a plurality of relatively smaller square apertures 103), the two bellows used for the respective test samples are identical to each other. As a cycle of the repetitive high-temperature salt-damage corrosion test procedure, an immersion step at which the test samples are immersed in saturated sodium chloride aqueous solution, a high-temperature heating step at which the test samples are heated at high temperature of 550° C. or more, and a cooling step at which the test samples are cooled, were made in that order. A rate of decrease in thickness of each bellows of the two test samples is measured every cycles of the corrosion test. As can be appreciated from test results shown in FIG. 6, the rate of decrease in thickness of the bellows accommodated in the low-density knitted stainless-steel-wire outer braid is largely reduced in comparison with that of the bellows accommodated in the high-density knitted stainless-steel-wire outer braid. From the point of view of resistance against a high-temperature salt-damage corrosion, the low-density knitted stainless-steel-wire outer braid is superior to the conventional high-density knitted stainless-steel-wire outer braid.

Figure 9:
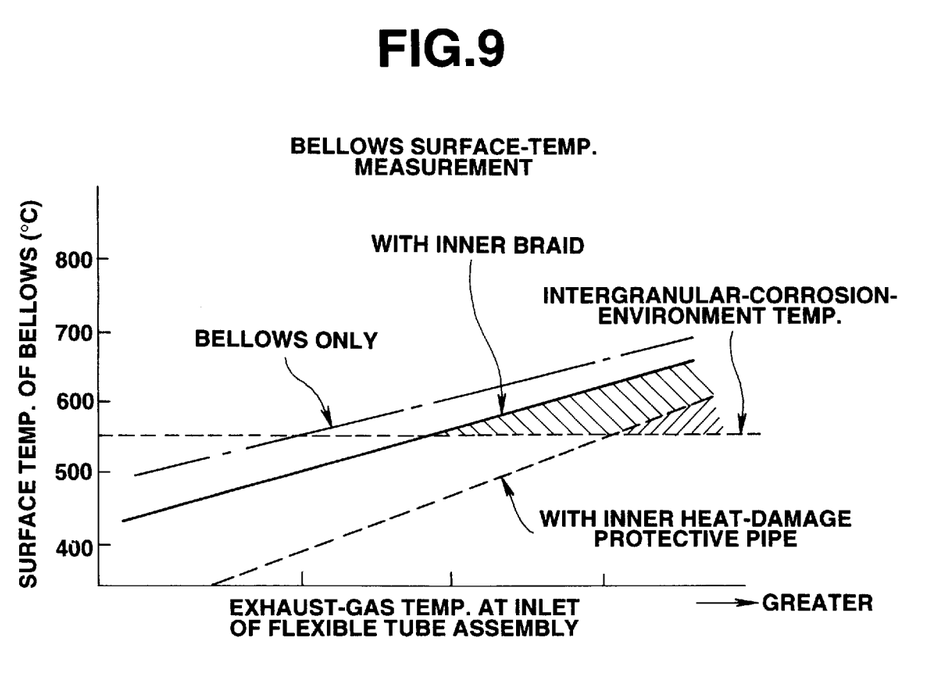
FIG. 9 is a graph illustrating readings of measurement of a surface temperature of a metal bellows which measurement is made to three different test samples, namely a metal bellows only (without any inner flexible tube), a metal bellows accommodating therein a usual high-density knitted metal wire inner braid, and a metal bellows accommodating therein an inner heat-damage protective pipe.

As shown in FIGS. 1 and 5A, the flexible connection tube assembly F of the preferred embodiment also includes the two tube-like extensions 6b and 7b, which are inserted into the flexible stainless steel bellows 1. The two tube-like extensions 6b and 7b ensure a smooth exhaust-gas flow from the front exhaust pipe 6 via the flexible connection tube assembly F to the rear exhaust pipe 7. In case of the flexible tube assembly shown in FIG. 1, the respective extensions 6b and 7b are formed as a portion of each exhaust pipe by way of drawing for example, so that the rear end of the front exhaust pipe 6 is slightly axially extended and diametrically diminished and the front end of the rear exhaust pipe 7 is slightly axially extended and diametrically diminished. As best seen in FIG. 1, when assembling, the two opposing extensions 6b and 7b are slightly spaced apart from each other in such a manner as to prevent the interference between the two opposing extensions which may occur due to expansion of the front and rear exhaust pipes when the vehicle is running or during operation of the engine. The extensions 6b and 7b do not have any apertures on their outer peripheries, and thus the extensions 6b and 7b are very effective to reduce noises such as a turbulence noise secondarily caused by turbulent exhaust-gas flow occurring at inwardly projecting troughs or furrows of the bellows 1. Also, the extensions 6b and 7b not formed with any apertures, are very effective to protect the bellows 1 from heat damage. The extensions 6b and 7b can insure a high heat insulating effect as well as a high noise-reduction effect. In particular, the flexible tube assembly with the inner tube-like extensions 6b and 7b can provide a higher heat insulating effect as compared with a flexible tube assembly not including any heat-damage protective pipe or with a flexible tube assembly with a conventional inner braided stainless-steel-wire tube having many square apertures. Referring to FIG. 9, there is shown results of measurement of a surface temperature of stainless steel bellows. The bellows surface-temperature measurement is made to three different test samples, namely a first flexible tube assembly (indicated by the one-dotted line in FIG. 9) comprised of only a stainless steel bellows, a second flexible tube assembly (indicated by the solid line in FIG. 9) comprised of a stainless steel bellows and an inner braided stainless-steel-wire tube (or an inner braid) disposed inside of the bellows, and a third flexible tube assembly (indicated by the broken line in FIG. 9) comprised of a stainless steel bellows and an inner heat-damage protective pipe just like the axially extended and diametrically diminished exhaust-pipe extensions 6b and 7b shown in FIG. 1. To enhance a reliability of test results, three stainless steel bellows used for the respective test samples are identical to each other. The surface-temperature measurement was made by firstly setting a gas temperature (corresponding to a temperature of exhaust gas flowing through the flexible tube and measured at the inlet of the respective flexible tube) at a predetermined temperature, and by secondly measuring a surface temperature of each bellows of the first, second and third flexible tubes. The test data shown in FIG. 9 were obtained by stepwisely rising the predetermined temperature. As appreciated from the one-dotted line of FIG. 9, in case of the first flexible tube assembly having only the bellows, the surface temperature of the bellows reaches 550° C. (corresponding to a so-called intergranular-corrosion-environment temperature) when the gas temperature measured at the inlet of the first flexible tube assembly is comparatively low. In case of the second flexible tube assembly with the inner braid as well as the bellows, the surface temperature of the bellows reaches 550° C. when the gas temperature measured at the inlet of the second flexible tube assembly is not so high. On the other hand, in case of the third flexible tube assembly with the inner heat-damage protective pipe as well as the bellows, the surface temperature of the bellows reaches 550° C. when the gas temperature measured at the inlet of the third flexible tube assembly is considerably high. As can be appreciated from the graph shown in FIG. 9, the bellows surface-temperature of the third flexible tube assembly with the heat-damage protective pipe can be reduced to a value equivalent to a temperature difference of 50° C. to 100° C. in comparison with the second flexible tube assembly with the inner braid. The test results of FIG. 9 substantiate that the third flexible tube assembly with the heat-damage protective pipe is superior to the first and second flexible tube assemblies with respect to resistance against high-temperature salt-damage corrosion. As shown in FIG.

Figure 7:
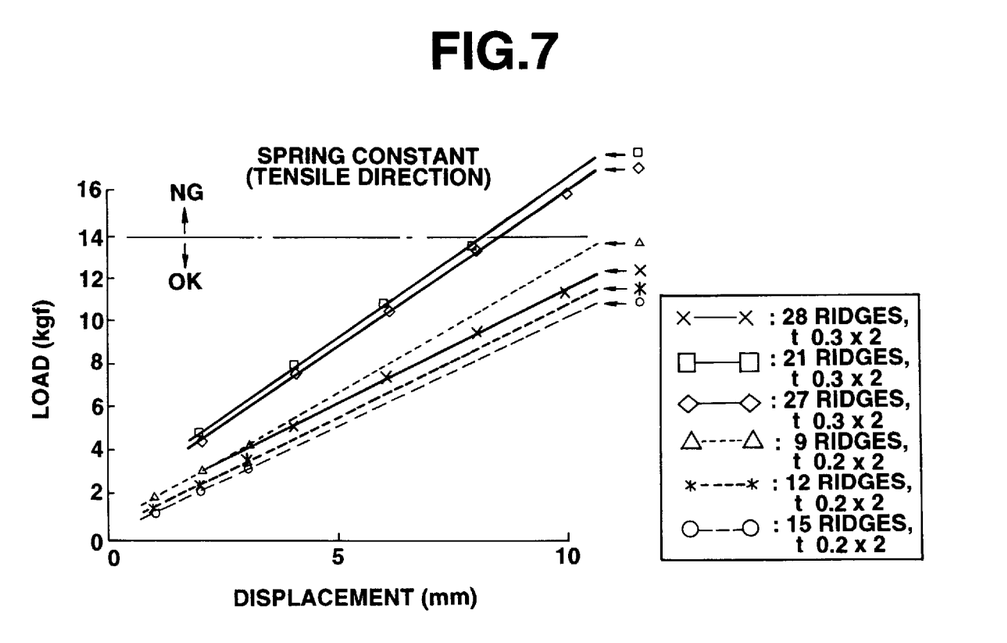
FIG. 7 is a graph illustrating characteristics of spring constant (the relation between displacement and load), depending on variations in thickness of a metal bellows and on variations in the number of ridges of the bellows.

1, if the inner heat-damage protective pipe (for example comprised of the exhaust-pipe extensions 6b and 7b) is combined with the outer braid 2 having a plurality of square apertures 4 and additionally a flexible tube assembly is comprised of the stainless steel bellows, the outer braid, and the inner heat-damage protective pipe, a salt-damage corrosion environment may not be easily created between the outer braid and the bellows owing to plural apertures 4 and a rise in surface-temperature of the bellows may be suppressed by the use of the heat-damage protective pipe. The bellows employed in the flexible connection tube assembly as shown in FIG. 1 can be more effectively protected from both heat damage and salt damage by combination of the outer braid 2 with the inner heat-damage protective pipe for example comprised of the previously-explained exhaust-pipe extensions 6b and 7b. It will be appreciated that a flexible tube assembly having a stainless steel bellows 1, a low-density knitted stainless-steel-wire outer braid 2 and an inner heat-damage protective pipe (6b, 7b) is more superior to a flexible tube assembly having a stainless steel bellows 1 and a low-density knitted stainless-steel-wire outer braid 2 with respect to resistance against high-temperature salt-damage corrosion. As set out above, the flexible tube assembly having at least a stainless steel bellows and a low-density knitted stainless-steel-wire outer braid 2 exhibits a high resistance against high-temperature salt-damage corrosion, and thus high-temperature salt-damage corrosive wear of the bellows can be reduced. Therefore, the thickness of the bellows can be reduced or thinned to a value smaller than a typical two-layer flexible stainless steel bellows of its thickness of 0.6 mm (t0.3 mm×2). The thickness of the bellows 1 employed in the flexible tube assembly F of the preferred embodiment as shown in FIG. 1 is actually set at 0.4 mm. In general, the thinner the thickness of the bellows, the smaller the spring constant of the bellows. In addition, the larger the number of ridges of the bellows, the smaller the spring constant of the bellows. Thus, in consideration of both a thickness and a spring constant, the number of ridges of the bellows employed in the flexible tube assembly of the preferred embodiment is reduced to a smaller value (e.g. 9 ridges) in comparison with a prior art flexible stainless steel bellows having its thickness of 0.6 mm and 28 ridges. In other words, the thinned bellows 1 can be small-sized in entire length, while ensuring a satisfactory absorption or compensation for linear expansion or contraction of a run of exhaust piping. Referring to FIG. 7, there are shown test results representative of spring-constant characteristics of six different bellows. All of the six test samples are made of a two-layer austenitic stainless steel plate composed of two similar austenitic stainless steel plates bonded together. A first test sample is a typical two-layer stainless steel bellows of 28 ridges and 0.6 mm (=t0.3 mm×2) in thickness and made of a two-layer stainless steel plate composed of two similar stainless steel plates (each plate having a thickness of 0.3 mm). A second test sample is a two-layer stainless steel bellows having 21 ridges and 0.6 mm in thickness. A third test sample is a two-layer stainless steel bellows having 27 ridges and 0.6 mm in thickness. A fourth test sample is a two-layer stainless steel bellows having 9 ridges and 0.4 mm in thickness. A fifth test sample is a two-layer stainless steel bellows having 12 ridges and 0.4 mm in thickness. A sixth test sample is a two-layer stainless steel bellows having 15 ridges and 0.4 mm in thickness. According to a conventional tensile test procedure, one end of each tested bellows is connected to a fixed point and the other end is loaded in the tensile direction, and then the magnitude of a tensile load applied to the tested bellows and an elongation of the tested bellows are measured successively. As appreciated from the tensile test results shown in FIG. 7, in case of the two-layer stainless steel bellows of 0.6 mm (=t0.3 mm×2) in thickness, only the first test sample (the two-layer stainless steel bellows of 28 ridges) is within a permissible spring-constant range in which an axial displacement of 10 mm is obtained under a tensile load of 14 kgf or less. The second (21 ridges) and third (27 ridges) test samples are both out of the permissible spring-constant range. In contrast to the above, in case of the two-layer stainless steel bellows of 0.4 mm (=t0.2 mm×2) in thickness, the fourth (9 ridges), fifth (12 ridges) and sixth (15 ridges) test samples are all within the permissible spring-constant range. On the basis of these test results, the inventors have found and discovered that a stainless-steel flexible connection tube product can be small-sized and lightened, while satisfying a required performance of the bellows and insuring a high resistance against a high-temperature salt-damage corrosion, by way of combination of a low-density knitted stainless-steel-wire outer braid 2 having a plurality of comparatively large square apertures 4 with a two-layer, comparatively thinned stainless steel bellows of 9 ridges and 0.4 mm (=t0.2 mm×2) in thickness. As seen in the two sketches of FIGS. 1 and 12, the entire length L2 of a conventional two-layer stainless steel bellows of 28 ridges and 0.6 mm (=t0.3 mm×2) in thickness is 270 mm (see FIG. 12), whereas the entire length L1 of the improved two-layer stainless steel bellows of 9 ridges and 0.4 mm (=t0.2 mm×2) in thickness is 105 mm (see FIG. 1). The entire length of the improved bellows 1 is reduced to a length of not more than half the entire length of the prior art flexible bellows 100. The other dimensions and geometry (a pitch between two adjacent ridges 1a and an inside diameter of two cylindrical female tube-like portions 1b) of the bellows 1 are identical to those of the prior art bellows 100.

Figure 8:
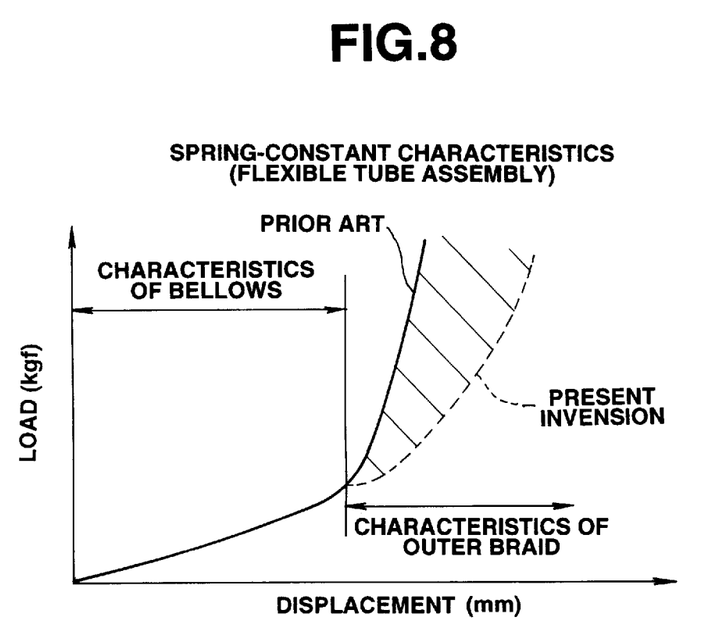
FIG. 8 is a graph illustrating spring-constant characteristics (changes in spring constant), comparing the improved flexible tube assembly employing a low-density knitted metal wire outer braid and a flexible metal bellows with a prior art flexible tube assembly employing a high-density knitted metal wire outer braid and a flexible metal bellows.

As will be appreciated from the above, in the flexible tube assembly made according to the present invention, a flexible stainless-steel-wire outer braid 2 is formed as a comparatively low-density knitted stainless-steel-wire braid by knitting a plurality of stainless-steel-wire bundles 2a extending along the bellows 1 in their spiral directions from one end of the bellows to the other end so that inside edges of four adjacent bundles define a comparatively large square or rhombic aperture 4 and so that the total opening area of all of the square or rhombic apertures 4 is set to be preferably within a range of 20% to 30% with respect to the over-all area of the curved surface of the outer braid 2. The flexible tube assembly with the low-density knitted stainless-steel-wire braid 2 covering a flexible stainless steel bellows, exhibits a high salt-damage resisting property (consequently a high resistance against high-temperature salt-damage corrosion). In the preferred embodiment shown in FIG. 1, an inner heat-damage protective pipe (6b; 7b) is also formed as a portion of each of front and rear exhaust pipes and provided in the interior of the bellows, and additionally the inner heat-damage protective pipe is combined with the low-density knitted outer braid, thus remarkably enhancing a resistance against high-temperature salt-damage corrosion. In the embodiment shown in FIG. 1, the inner heat-damage protective pipe is not designed as an additional part separated from each of front and rear exhaust pipes, and thus the number of parts constructing a flexible connection tube assembly can be reduced. Additionally, in the shown embodiment, owing to the use of the previously-noted low-density knitted outer braid, the flexible tube assembly F can be produced by a two-layer, thinned austenitic-stainless-steel bellows of 9 ridges and 0.4 mm (=t0.2 mm×2) in thickness, and thus the whole size of the flexible tube assembly F can be small-sized and lightened. This increases a degree of freedom of design in an exhaust system. As seen in FIG. 8, in comparison with a conventional high-density knitted stainless-steel-wire outer braid, the use of a low-density knitted stainless-steel-wire outer braid results in remarkable reduction in spring constant of the outer braid itself and thus reduces a total spring-constant of the flexible tube assembly. Referring now to FIG. 8, there are shown tensile-test results, which test is made to two different samples. A first test sample is a conventional flexible tube assembly comprised of a high-density knitted stainless-steel-wire outer braid and a flexible two-layer stainless steel bellows of 28 ridges and 0.6 mm (t0.3 mm×2) in thickness. A second test sample is an improved flexible tube assembly comprised of a low-density knitted stainless-steel-wire outer braid and a flexible stainless steel bellows of 28 ridges and 0.6 mm (t0.3 mm×2) in thickness. As appreciated from the left-hand solid line of FIG. 8, within a comparatively small tensile load range, only the bellows is stretched and thus each spring constant (or each flexibility) of the first and second test samples is dependent on a spring constant of only the bellows, with the result that spring constants of the first and second test samples are identical to each other, because the bellows used in the first test sample is identical to that used in the second test sample. In accordance with an increase in the tensile load applied to the respective test samples, the outer braid as well as the bellows begins to stretch. The low-density knitted outer braid is apt to elongate or contract in its axial direction (in its tensile or compressive directions), in comparison with the high-density knitted outer braid. As seen in the right-hand broken line of FIG. 8, within a comparatively high tensile load range, the total spring constant of the second test sample (the improved flexible tube assembly) can be reduced to a relatively low level owing to a comparatively lower spring constant of the low-density knitted outer braid. The greater the flexibility of the flexible tube assembly, the higher the vibration dampening or absorbing performance in the exhaust system, and thus, the improved flexible tube assembly with a flexible stainless steel bellows and a low-density knitted stainless-steel-wire outer braid may remarkably reduce unpleasant noises and vibrations and enhance a durability of the exhaust system. As set forth, in the case that the outer braid is formed as a low-density knitted stainless-steel-wire outer braid, the total amount of stainless steel wires used for the outer braid can be reduced, thus reducing production costs of a flexible tube assembly. As explained in reference to FIG. 1, if a thinned austenitic stainless steel bellows (e.g. 9 ridges and 0.4 mm in thickness) as well as a low-density knitted stainless-steel-wire outer braid is used as a component of the flexible tube assembly, total production costs of a flexible tube assembly may be considerably reduced.

Figure 10:
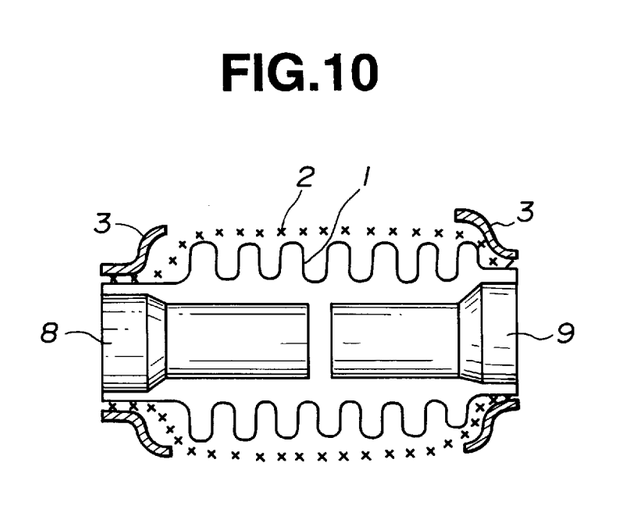
FIG. 10 is a schematic illustration of a flexible connection tube assembly with two axially opposing inner heat-damage protective pipes.
Figure 11:
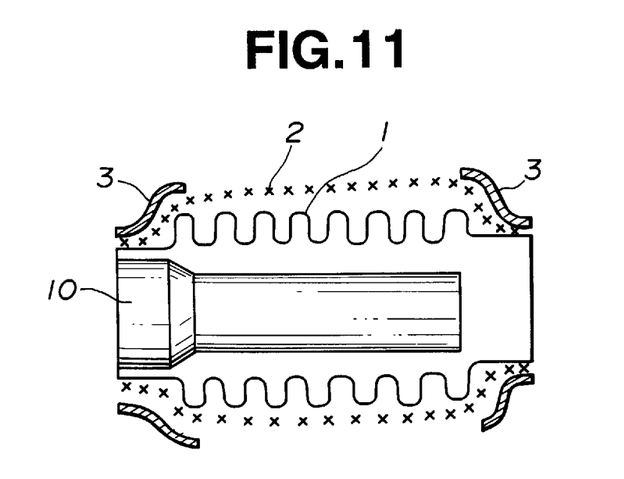
FIG. 11 is a schematic illustration of a flexible connection tube assembly with a single inner heat-damage protective pipe.

In the preferred embodiment shown in FIG. 1, although a thinned flexible bellows is made of a two-layer austenitic stainless steel plate composed of two similar austenitic stainless steel plates each having a thickness of 0.2 mm, and the thinned flexible bellows is formed into 9 ridges, the thinned bellows of 9 ridges and 0.4 mm in thickness may be replaced with another type of bellows having a proper number of ridges (different from 9 ridges) and/or a proper thickness (different from 0.4 mm) for satisfying a required performance (or a required flexibility) that an axial displacement (or an elongation) of 10 mm is obtained under a tensile load of 14 kgf or less. To provide a substantially same performance as a flexible two-layer stainless steel bellows of 9 ridges and 0.4 mm (t0.2 mm×2) in thickness, a stainless steel bellows having 15 or less ridges and a thickness equivalent to a spring constant that an axial displacement (or an elongation) of 10 mm is obtained under a tensile load of 14 kgf or less, may be used. For example, a flexible two-layer stainless steel bellows of 12 or 15 ridges and 0.4 mm (t0.2 mm×2) in thickness (see FIG. 7) is applicable to a thinned flexible bellows having a required performance. Alternatively, a thinned flexible bellows may be made of a two-layer austenitic stainless steel plate composed of two different austenitic stainless steel plates, one having a thickness of 0.2 mm and the other having a thickness of 0.3 mm or made of a three-layer austenitic stainless steel plate composed of three similar austenitic stainless steel plates each having a thickness of 0.15 mm. In the preferred embodiment as shown in FIG. 1, an inner heat-damage protective pipe is formed as extensions (6b; 7b) extended from the rear end of the front exhaust pipe and from the front end of the rear exhaust pipe. Alternatively, the inner heat-damage protective pipe may be suitably modified as discussed later. As seen in FIG. 10, the inner heat-damage protective pipe may be provided in the form of two separated, opposing inner pipes fixedly connected to respective inner peripheries of both ends of the bellows 1. As seen in FIG. 11, a comparatively long, single inner pipe, fixedly connected to one end of the bellows 1, may be used as an inner heat-damage protective pipe. In the shown embodiment, for the purpose of providing a low-density knitted stainless-steel-wire outer braid, the number of fine stainless steel wires constructing one stainless steel wire bundle 2a is reduced from 14 wires to 10 wires. Alternatively, the number of plural stainless-steel-wire bundles, required for producing one outer braid, may be reduced to a value less than 48 bundles, retaining both the number of fine stainless steel wires used to produce one bundle and a wire diameter unchanged, or only a wire diameter of fine stainless steel wires used for one bundle may be reduced to a value less than 0.4 mm, remaining both the number of fine stainless steel wires used to produce one bundle and the number of plural bundles required for producing one outer braid unchanged. That is, to provide a desired low-density knitted stainless-steel-wire outer braid, it is necessary to reduce at least one of the stainless steel wire diameter, the number of stainless-steel-wire bundles, and the number of fine stainless steel wires necessary for one stainless-steel-wire bundle. Moreover, in the preferred embodiment of FIG. 1, when manufacturing a low-density knitted outer braid with comparatively large square or rhombic apertures, although the total opening area of all of the square or rhombic apertures is set within a range of 20% to 30% with respect to the over-all area of the curved surface of the outer braid, the rate of the total opening area of all of the apertures to the over-all curved-surface-area of the outer braid may range from 20% (corresponding to a lower limit for exhausting action of many lumps of dry salt) to 50% (corresponding to an upper limit for protection of the bellows from damage such as flying gravel sprung from tires).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A flexible connection tube for an automotive exhaust system comprising:

a flexible bellows adapted to be connected between a series of exhaust pipes and being flexible in both directions of expansion and contraction for absorbing expansion or contraction of said exhaust pipes; and an outer knitted metal wire braid covering an outer periphery of said bellows for protecting said bellows from damage and for preventing said bellows from stretching to its full length, wherein said outer knitted metal wire braid comprises a plurality of metal-wire bundles, each having a plurality of metal wires connected parallel to each other and in contact with each other with respect to a lateral direction of said metal wires, and wherein said outer knitted metal wire braid has a substantially cylindrical shape, formed by knitting said plurality of metal-wire bundles alternately with each other in spiral directions with respect to an axial direction of said bellows so that each of said metal-wire bundles extends along the outer periphery of said bellows in its spiral direction over both ends of said bellows, wherein said outer knitted metal wire braid has a plurality of apertures defined by groups of four adjacent metal-wire bundles knitted alternately with each other, and wherein a total opening area of all of said apertures is set within a range of 20% to 50% with respect to an over-all area of a curved surface of said outer knitted metal wire braid, to provide a substantially cylindrical low-density knitted outer metal wire braid.

2. A flexible connection tube for an automatic exhaust system comprising:

a flexible bellows adapted to be connected between a series of exhaust pipes and being flexible in both directions of expansion and contraction for absorbing expansion or contraction of said exhaust pipes; and an outer knitted metal wire braid covering an outer periphery of said bellows for protecting said bellows from damage and for preventing said bellows from stretching to its full length, wherein said outer knitted metal wire braid comprises a plurality of metal-wire bundles, each having a plurality of metal wires connected parallel to each other and in contact with each other with respect to a lateral direction of said metal wires, and wherein said outer knitted metal wire braid has a substantially cylindrical shape, formed by knitting said plurality of metal-wire bundles alternately with each other in spiral directions with respect to an axial direction of said bellows so that each of said metal-wire bundles extends along the outer periphery of said bellows in its spiral direction over both ends of said bellows, wherein said outer knitted metal wire braid has a plurality of apertures defined by groups of four adjacent metal-wire bundles knitted alternately with each other, wherein a total opening area of all of said apertures is set within a range of 20% to 50% with respect to an over-all area of a curved surface of said outer knitted metal wire braid, to provide a substantially cylindrical low-density knitted outer metal wire braid, and wherein said bellows is a flexible metal bellows having 15 or less ridges and a thickness equivalent to a spring constant having an elongation of 10 mm or less under a tensile load of 14 kgf or less.

3. A flexible connection tube as claimed in claim 2, wherein said bellows is made of a two-layer stainless steel plate composed of two similar stainless steel plates bonded together, each plate having a thickness of 0.2 mm, and bent into said bellows having 9 ridges.

4. A flexible connection tube as claimed in claim 1, further comprising an inner heat-damage protective pipe disposed in said bellows for protecting said bellows from heat damage.

5. A flexible connection tube for an automatic exhaust system comprising:

a flexible bellows adapted to be connected between a series of exhaust pipes and being flexible in both directions of expansion and contraction for absorbing expansion or contraction of said exhaust pipes;

an inner heat-damage protective pipe disposed in said bellows for protecting said bellows from heat damage; and an outer knitted metal wire braid covering an outer periphery of said bellows for protecting said bellows from damage and for preventing said bellows from stretching to its full length, wherein said outer knitted metal wire braid comprises a plurality of metal-wire bundles, each having a plurality of metal wires connected parallel to each other and in contact with each other with respect to a lateral direction of said metal wires, and wherein said outer knitted metal wire braid has a substantially cylindrical shape, formed by knitting said plurality of metal-wire bundles alternately with each other in spiral directions with respect to an axial direction of said bellows so that each of said metal-wire bundles extends along the outer periphery of said bellows in its spiral direction over both ends of said bellows, wherein said outer knitted metal wire braid has a plurality of apertures defined by groups of four adjacent metal-wire bundles knitted alternately with each other, wherein a total opening area of all of said apertures is set within a range of 20% to 50% with respect to an over-all area of a curved surface of said outer knitted metal wire braid, to provide a substantially cylindrical low-density knitted outer metal wire braid, and wherein said bellows comprises a pair of substantially cylindrical female tube-like portions at its both ends and said heat-damage protective pipe comprises two opposing, axially extending, diametrically diminished exhaust-pipe ends, respectively inserted into said female tube-like portions.

6. A flexible connection tube for an automatic exhaust system comprising:

a flexible bellows adapted to be connected between a series of exhaust pipes and being flexible in both directions of expansion and contraction for absorbing expansion or contraction of said exhaust pipes; and an outer knitted metal wire braid covering an outer periphery of said bellows for protecting said bellows from damage and for preventing said bellows from stretching to its full length, wherein said outer knitted metal wire braid comprises a plurality of metal-wire bundles, each having a plurality of metal wires connected parallel to each other and in contact with each other with respect to a lateral direction of said metal wires, and wherein said outer knitted metal wire braid has a substantially cylindrical shape, formed by knitting said plurality of metal-wire bundles alternately with each other in spiral directions with respect to an axial direction of said bellows so that each of said metal-wire bundles extends along the outer periphery of said bellows in its spiral direction over both ends of said bellows, wherein said outer knitted metal wire braid has a plurality of apertures defined by groups of four adjacent metal-wire bundles knitted alternately with each other, wherein a total opening area of all of said apertures is set within a range of 20% to 50% with respect to an over-all area of a curved surface of said outer knitted metal wire braid, to provide a substantially cylindrical low-density knitted outer metal wire braid, and wherein at least one of a wire diameter of each of said metal wires, the number of said metal-wire bundles constructing said substantially cylindrical low-density knitted outer metal wire braid, and the number of said metal wires constructing each of said metal-wire bundles is reduced for setting said total opening area of said apertures within said range of 20% to 50% with respect to said over-all area of the curved surface of said outer knitted metal wire braid.

7. A flexible stainless steel connection tube for an automotive exhaust system comprising:

a flexible austenitic-stainless-steel bellows adapted to be connected between a run of exhaust piping and being flexible in both directions of expansion and contraction for absorbing expansion or contraction of said exhaust piping; and an outer knitted stainless-steel-wire braid covering an outer periphery of said bellows for protecting said bellows from damage and for preventing said bellows from stretching to its full length, wherein said outer knitted stainless-steel-wire braid comprises a plurality of stainless-steel-wire bundles, each having a plurality of similar stainless steel wires connected parallel to each other and in contact with each other with respect to a lateral direction of said stainless steel wires, and wherein said outer knitted stainless-steel-wire braid has a substantially cylindrical shape, formed by knitting said plurality of stainless-steel-wire bundles alternately with each other in spiral directions with respect to an axial direction of said bellows so that each of said stainless-steel-wire bundles extends along the outer periphery of said bellows in its spiral direction over both ends of said bellows, wherein said outer knitted stainless-steel-wire braid has a plurality of apertures defined by groups of four adjacent stainless-steel-wire bundles knitted alternately with each other, and wherein a total opening area of all of said apertures is set within a range of 20% to 50% with respect to an over-all area of a curved surface of said outer knitted stainless-steel-wire braid, to provide a substantially cylindrical low-density knitted outer stainless-steel-wire braid.

8. A flexible connection tube as claimed in claim 7, wherein said bellows is a flexible austenitic-stainless-steel bellows having 15 or less ridges and a thickness equivalent to a spring constant having an elongation of 10 mm or less under a tensile load of 14 kgf or less.

9. A flexible connection tube as claimed in claim 8, further comprising an inner heat-damage protective pipe disposed in said bellows for protecting said bellows from heat damage.

10. A flexible connection tube as claimed in claim 9, wherein said bellows comprises a pair of substantially cylindrical female tube-like portions at its both ends and said heat-damage protective pipe comprises two opposing, axially extending, diametrically diminished exhaust-pipe ends, respectively inserted into said female tube-like portions.

* * * * *